United States Patent [19]

Ouimet

[11] Patent Number: 4,993,124
[45] Date of Patent: Feb. 19, 1991

[54] WORM DRIVE CLAMP WITH AUTOMATIC SPRING LEVER

[76] Inventor: Serge Ouimet, 330 Dufresne, Ile Bizard, Quebec, Canada, H9C 2C3

[21] Appl. No.: 468,604

[22] Filed: Jan. 22, 1990

[51] Int. Cl.⁵ .................................................. B65D 63/00
[52] U.S. Cl. ..................................... 24/274 R; 24/279
[58] Field of Search ............ 24/274 R, 274 WB, 278, 24/279, 282; 285/253

[56] References Cited

U.S. PATENT DOCUMENTS

| | | | |
|---|---|---|---|
| 2,940,150 | 6/1960 | Rizzo | 24/274 R |
| 2,944,314 | 7/1960 | Black | 24/274 R |
| 3,087,220 | 4/1963 | Tinsley | 24/274 R |
| 4,445,254 | 5/1984 | Allert | 24/279 |
| 4,686,747 | 8/1987 | Bakdahl | 24/274 R |

*Primary Examiner*—Victor N. Sakran

[57] ABSTRACT

A worm drive clamp comprising a flexible metal band having a housing secured to a connecting portion thereof. A worm screw, having a spiral thread, is supported for axial rotation in the housing adjacent a side of the band connecting portion. The worm screw has its rotational axis co-extending with the longitudinal axis of the metal band. A resilient leaf spring is secured to the side of the band adjacent the worm screw for biasing the free end portion of the band positioned thereover against the screw when the band is tightened about an object. The free end portion of the band is provided with spaced-apart screw thread engaging teeth or slots along a length thereof to engage with the spiral thread of the worm screw. The housing is also provided with an inlet and an outlet port for the passage of the free end of the band through the housing. The leaf spring has a flexible connection to permit the band to be slidingly displaced adjacent the worm screw without arresting threaded engagement between the spiral thread of the worm screw and the thread engaging teeth provided in the free end portion of the band. When the band is tightened about the object the spring urges the free end portion of the band to enter into threaded engagement with the worm screw.

15 Claims, 3 Drawing Sheets

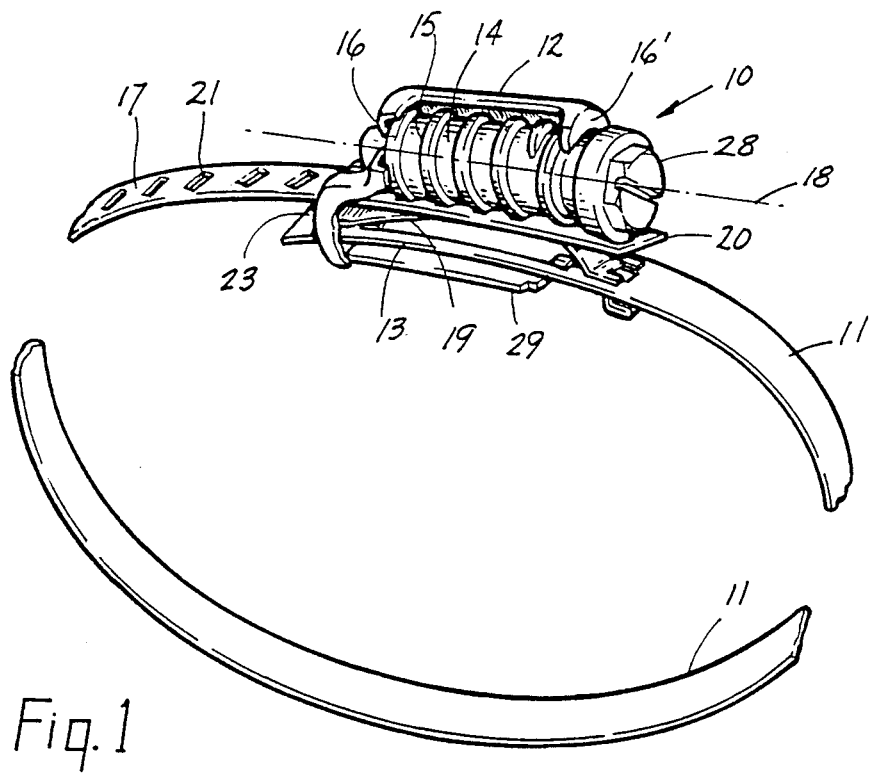
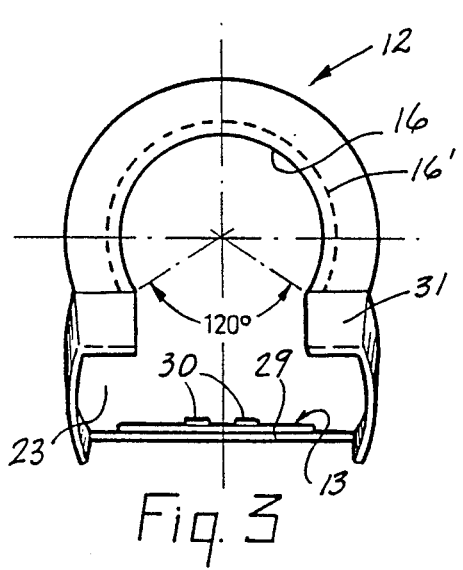
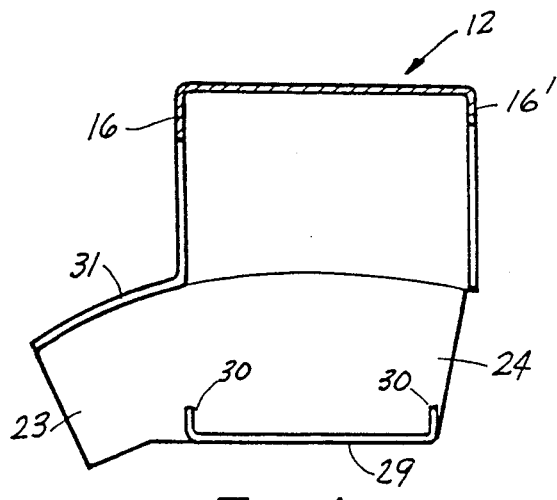
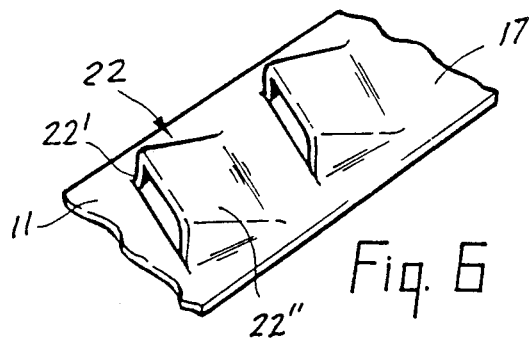

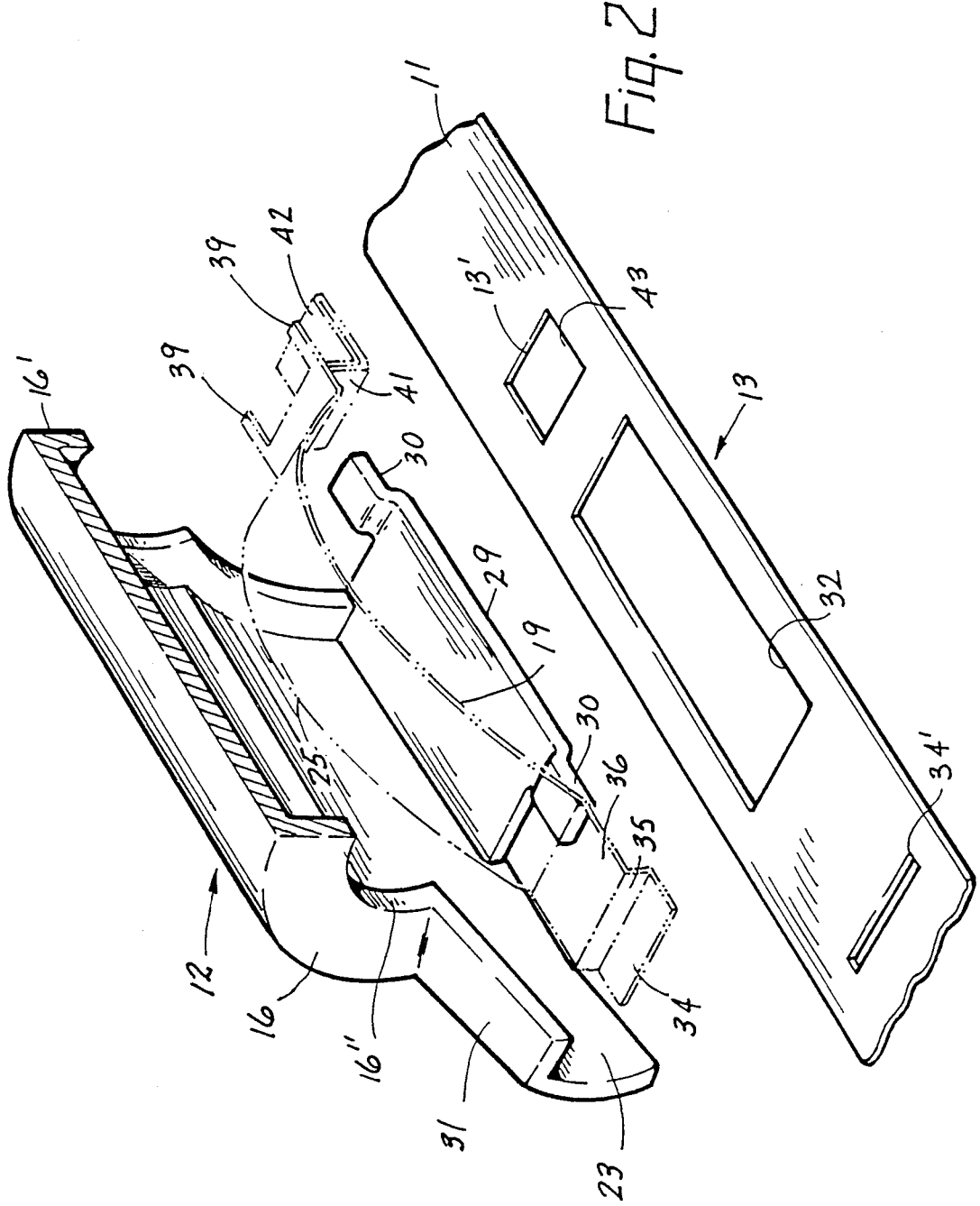

WORM DRIVE CLAMP WITH AUTOMATIC SPRING LEVER

BACKGROUND OF THE INVENTION

1. Filed of Invention

The present invention relates to a worm drive clamp and wherein a flexible biasing means is provided within the clamp housing to permit a free end portion of the band to slide through the housing without threaded engagement with a worm screw provided in the housing and wherein the free end portion of the band becomes automatically engaged with the worm screw once a resulting clamping pressure is achieved by the band about a object to which it is being secured.

2. Description of Prior Art

Various worm clamps are known for tightening a metal band about an object, such as a hose, pipe, joint, or any other suitable objects. Such worm drive clamps have various applications in all types of industries and are utilized for clamping or attaching various objects. A conventional type of such clamps, is, for example, described in U.S. Pat. No. 3,087,220. However, with such clamp or various similar clamps, as soon as the free end portion of the metal band is inserted into the housing it becomes immediately into contact with the worm screw thread and it is necessary to rotate the worm screw to engage the free end of the metal band and advance it through the housing to effect a tightening action of the band by diminishing the circumferential length of the loop formed thereby. A disadvantage with such clamps, is that it is sometimes difficult to insert the free end of the metal band within the housing for threaded engagement with the worm screw. Furthermore, in order to advance the band to a tightening position, it is often required to make many turns of the worm screw. Also, it is difficult to maintain the housing of the worm screw in a fixed position about an object being clamped as the housing is displaced by the rotational engagement of the threaded screw on the band. These threading operations are also time consuming. It is also time consuming to remove a clamp already engaged as the worm screw must be rotated counter-clock wise the entire length of the secured free end portion of the band. A still further, disadvantage is that often the free end portion of the band is not positioned in full engagement with the threads of the bolt and only the tip of the threads engage with the engaging slots in the band and this often causes the band to disconnect after the band experiences axial tension thereby causing the threads or the slits to strip. This results in the destruction of the clamp.

SUMMARY OF INVENTION

It is a feature of the present invention to provide an improved worm drive clamp which substantially overcomes all of the above mentioned disadvantages of the prior art.

Another feature of the present invention is to provide a worm drive clamp which is provided with a flexible biasing means in the housing to permit the free end portion of the metal band to be slid into the housing without threaded engagement with the worm screw until a predetermined clamping pressure is achieved between the band and the object being clamped.

Another feature of the present invention is to provide a worm drive clamp which is easily and quickly secured to a clamp position about an object and also quickly removable from an object to which it is clamped.

According to the above features, from a broad aspect the present invention provides a worm drive clamp comprising a flexible metal band having a housing secured to a connecting portion thereof. A worm screw, having a spiral thread, is supported in the housing for free axial rotation thereof adjacent the first side of the band. The worm screw has its rotational axis co-extending with the longitudinal axis of the metal band. Flexible biasing means is secured to the first side of the band adjacent the worm screw. The band has spaced-apart screw thread engagement means formed in at least a portion thereof from a free end of the band. The housing has an inlet and oulet port disposed above the first side of the connecting portion of the band to permit entry and passage of the free end of the band through the housing. The flexible biasing means permits a length of the free end portion of the band to be slidingly displaced adjacent to worm screw without arresting threaded engagement between the spiral thread and the screw thread engaging means.

BRIEF DESCRIPTION OF DRAWINGS

A preferred embodiment of the present invention will now be described with reference to the accompanying drawings, in which FIG. 1 is a perspective view showing the construction of the worm drive clamp of the present invention;

FIG. 2 is a partly fragmented explosion view showing detailed parts of the construction of the worm drive clamp of the invention;

FIG. 3 is an end view of the housing;

FIG. 4 is a sectional side view of the housing;

FIG. 6 is a perspective view showing a section of the free end of the metal band showing the construction of the worm screw engaging teeth.

DESCRIPTION OF PREFERRED EMBODIMENTS

Figure 5:
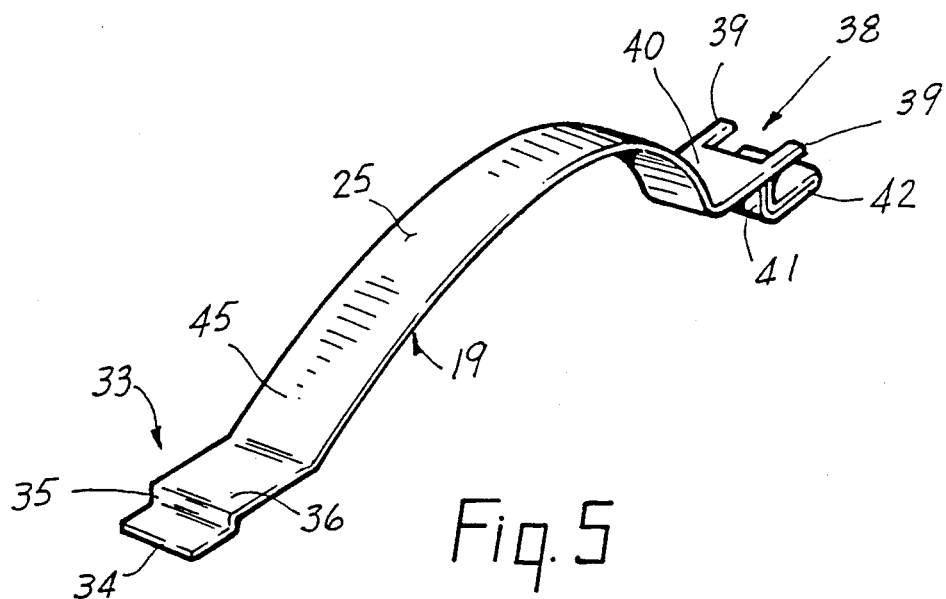
FIG. 5 is a perspective view showing the configuration of the leaf spring.

Referring now to the drawings and more particularly to FIG. 1, there is shown generally at 10 the worm drive clamp of the present invention. The clamp 10 is comprised of a flexible metal band 11 having a housing 12 secured to a connecting portion 13 of the band. A worm screw 14 having a spiral thread 15 is supported in the housing 12 between opposed transverse walls 16 and 16' for free axial rotation of the worm screw 14 adjacent a first side or top side 17 of the connecting portion 13 of the band 11. As can be seen the worm screw has its rotational axis 18 co-extending with the longitudinal axis of the metal band.

Flexible biasing means, in the form of a flat leaf bowed spring 19, is secured to the first side of the connecting portion of the band adjacent the worm screw 14. The free end portion 20 of the band 11 is provided with a plurality of spaced-apart screw thread engaging means extending along a length thereof. As shown in FIG. 1, the engaging means is in the form of engaging transverse slots 21. These can also be in the form of elevated teeth 22, as shown in FIG. 6. This free end portion 20 of the band is inserted through the housing 12 via the inlet and through the outlet ports, 23 and 24 respectively.

Figure 7:
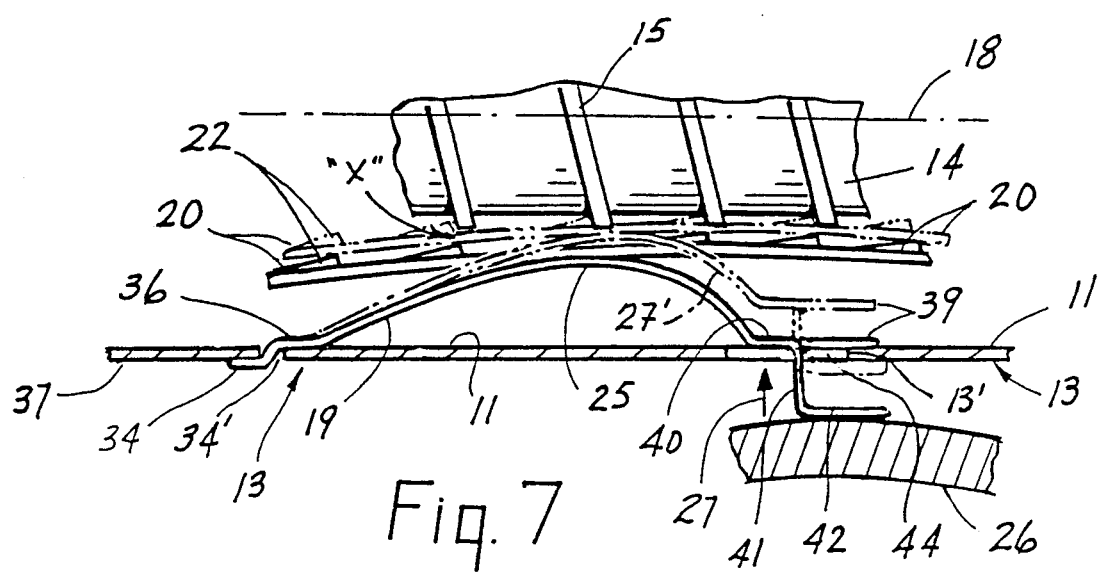
FIG. 7 is a fragmented side view showing the operation of the biasing spring relative to the worm screw.

Referring now to FIG. 7, it can be seen that the flat leaf spring 19 is normally biased with its curved biasing section 25 spaced from the spiral thread 15 a distance sufficient to permit the passage of the free end portion 20 of the band and its teeth 22 spaced from the teeth 15 and therefore in non-engagement therein. This clearance is identified at "X". As soon as the metal band 11 begins to tighten about an object, such as the pipe wall 26, the spring 19 moves in the direction of arrow 27, and as shown in phantom lines at 27', towards the worm screw 14 causing the engagement of the teeth 22 with the spiral thread 15. At that time, the screw is rotated by the use of a screwdriver, engaging with the head 28 of the worm screw to impart axial rotation thereof to further advance the free end portion 20 of the metal band 11 through the housing to tighten the band about the object 26. An alternate embodiment of the relationship between the spring and screw thread will be described later.

Referring now additionally to FIGS. 2 to 4, there will be described the construction of the housing 12. As herein shown, the housing has a connecting bottom wall 29 formed of two walls sections each provided with opposed retention wings 30 which are usually bent upwardly in a transverse direction to the bottom wall section (see FIG. 4). The bottom wall sections are formed integral with a lower edge of the worm screw retention housing 12 which is of partly circular cross section as shown in FIG. 3. The housing 12 is also provided with end bearing collars 16 and 16' at opposed ends thereof and having a circular section edge 16" which extends over 180° circumference (see FIG. 3) to retain the worm screw 14 therein, as is obvious to a person skilled in the art. A guide spout 31 is also formed integral with the housing 12 and disposed about the inlet port 23 to facilitate the insertion and to guide the free end portion 20 of the band 11 into that housing 12.

The connecting portion 13 of the band 11 is also provided with a large connecting hole 32 to receive therethrough the retention wings 30 of the bottom wall portions 29 by bending the wing portion 30 to the horizontal plane, see FIGS. 2 and 3. The connecting portion 13 of the metal band and the housing 12 are thus interconnected.

Referring now additionally to FIGS. 5 to 7, there will be described the construction, connection and operation of the flexible biasing leaf spring 19. As more clearly illustrated in FIG. 5, the leaf spring 19 is provided with an inner connecting end 33 for securement in the connecting slot 34 (see FIG. 2) close to the free end of the connecting portion 13 of the band 11. This inner connecting end 33 is formed by a right angle step portion stamped at the inner end of the spring 19 to define a lower leading flange 34 which merges into a short transverse wall 35. A flat top wall 36 merges into the top edge of the transverse wall 35 and rests on top of the band 11 adjacent to connecting slot 34 in the manner as shown in FIG. 7 when connected thereto. As can be seen, the transverse wall 35 extends within the slot 34' and the lower leading flange 34 is disposed against the bottom side 37 of the band 11. This connection permits pivotal displacement of the spring to effect a spring lever ejection as will be described later.

As can also be seen from FIG. 5, the other end or displacement end of the spring has a jaw member 38 formed intergral therewith. The jaw member is formed by stamping in the spring outer end a pair of spaced-apart fingers 39 in an end portion 40 of the spring with the fingers 39 extending in the same plane as the top wall 36 at the inner end of the spring. Accordingly, the spring lies normally in the position as shown in FIG. 7 when connected to the connecting portion 13 of the band 11.

The jaw member also defines a step flange extending between and under the fingers 39 and defined by a transverse wall 41 having a length sufficient to permit the biasing action of the spring. A forward tongue 42 is formed intergral with the transverse wall 41 and projects under the fingers, spaced therefrom, and substantially parallel thereto. A jaw retention hole 43 is also formed in a connecting portion 13 of the band 11, as is illustrated in FIG. 2. This retention hole 43 is disposed at a predetermined position so that a leading edge portion 13' (see also FIG. 7) of the band 11 projects between the fingers 39 and the tongue 42 leaving a clearance space 44 between the transverse wall 41 and the end of the projection portion 13' to permit the spring to deform when it is compressed to its biasing leverage position.

The leaf spring 19 is also provided with an upwardly sloping frontal section 45 to guide the band free end upwardly over the curved biasing section 25 without obstruction and, to facilitate passage of the free end section 20 or the band 11 through the housing 12 and in a non-threaded engagement with the spiral thread 15.

The forward tongue portion 42 of the jaw member 38 constitutes a spring pressure or spring leverage biasing means and may be arcuately shaped. As the band 11 is pulled through the housing 12 and becomes tightened about the object 26 on which it is clamped, the pulling action on the band causes the band to tighten about the object 26 thereby causing the forward tongue 42 to move in the direction of arrow 27, that is closer to its connecting portion 13, thereby causing the curved biasing section 25 of the spring 19 to urge the free end portion 20 of the band against the spiral thread 15 and in engagement therewith. At that point, the worm screw must be rotated to further tighten the band and at the same time, causes the forward tongue 42 to move against the lower surface of the connecting portion 13 of the band placing the spring section 25 in full compression against the free end portion of the band adjacent the worm screw 14. In this position, the spring 19 has experienced some deformation and for this reason, the spring is preferably constructed of spring steel so that it assumes its original shape as soon as the clamping pressure is removed. Thus, the spring 19 not only serves to bias the free end portion of the band in threaded engagement with the screw but maintains pressure against this band section to ensure that the spiral thread is in engagement with the teeth 22 to prevent the teeth 22 or the thread 15 to strip. Also, the spring 19 permits the band 11 to be disengaged with the spiral thread 15 as soon as sufficient clamping pressure is removed by unwinding the worm screw 14 to cause the spring 19 to assume its non-levering position, as shown in FIG. 7.

Instead of the band curved brasing section 25 being spaced from the spiral screw 14, the worm screw 14 may be retained in its housing with its thread 15 touching the curved brasing section 25 of the spring 19. When the free end 20 of the band 11 is introduced into the housing and pushed therein, it will cause the spring section 25 to flaten out and cause the transverse wall 41 to move in the clearance space 44 between it and the edge portion 13' (see FIG. 7). The clamping of wedging action of the spring would operate in the same manner as previously described when the band is tightened about an object applying a pushing force on the tongue 42.

It is within the ambit of the present invention to cover any obvious modifications of the examples of the preferred embodiment described therein. As mentioned herein above, the screw thread engaging means formed from the free end of the band may be constituted by a plurality of spaced-apart transverse slots 21, as shown in FIG. 1, or else a plurality of spaced-apart teeth 22, as shown in FIG. 6. These teeth 22 are punched in the band and are disposed at an angle of about 10° with respect to the longitudinal axis of the band 11. Each tooth 22 forms a thread engaging face 22' which is offset from the transverse axis of the band for ease of engagement with the angulated worm threads of the screw 14. The faces 22' face away from the free end of the band. A sloping structural wall 22" merges within the band 11 and provides a structurally strong tooth for engagement with the worm threads.

It is also pointed out that the jaw at the connecting end of the spring may be formed differently than as shown in FIG. 5 whereby to achieve the same operation and result as the structure herein shown and described. Also, the housing 12 may not be provided with a inlet spout and may simply have an opening. The bottom wall may be connected to the metal band in a different manner. The different holes provided in the connecting portion 13 of the band 11 could also have different configurations depending on the shape of their co-acting or connecting parts. It is also foreseeable that the spring could be formed integral with the band connecting portion by stamping a leaf spring out of the band material. The spring would be made to have a free end portion disposed through the slot created by the stamping and protruding over the rear surface with the connecting portion of the band.

I claim:

1. A worm drive clamp comprising a flexible metal band having a housing secured to a connecting portion thereof, a worm screw having a spiral thread supported in said housing for free axial rotation thereof adjacent a first side of said band, said worm screw having its rotational axis co-extending with the longitudinal axis of said metal band, flexible biasing means is provided on said first side of said band adjacent said worm screw, said band having spaced-apart screw thread engaging means formed in at least a portion thereof from a free end of said band, said housing having an inlet and outlet port disposed above said first side of said connecting portion of said band to permit entry and passage of said free end of said band through said housing, said flexible biasing means permitting a length of said free end portion of said band to be slidingly displaced adjacent said worm screw without arresting threaded engagement between said spiral thread and said screw thread engaging means, said flexible biasing means is a resilient member having a biasing section disposed at a predetermined position with respect to said worm screw and permitting passage of said band adjacent said spiral thread of said worm screw, without engaging said thread, said resilient member also having a displaceable section to permit said biasing section to be displaced toward said worm screw for urging said free end of said band in engagement with said worm screw when clamping pressure is applied to said displaceable connection in the direction of said screw by clamping said band about an object.

2. A clamp as claimed in claim 1 wherein said resilient member is a leaf spring, said biasing section being a curved biasing section having a flat support surface, said displaceable section having spring pressure exertion means to cause said biasing support surface to urge said band disposed thereover to engage with said spiral thread when said band is positioned about an object to be clamped and upon reaching a predetermined circumferential clamping pressure.

3. A clamp as claimed in claim 2 wherein said leaf spring has an inner connecting end for securement to said connecting portion of said band, said inner connecting end permitting pivotal displacement of said spring.

4. A clamp as claimed in claim 3 wherein said displaceable section is comprised of a jaw member formed at an outer end of said spring, said jaw member being captive in a retention hole formed in said connecting portion of said band adjacent said outlet of said housing to permit said spring outer end to be displaced laterally a distance equivalent to the opening of the mouth of said jaw.

5. A clamp as claimed in claim 4 wherein said jaw member is formed integral with said spring by at least a pair of spaced-apart fingers formed in said spring outer end.

6. A clamp as claimed in claim 4 wherein said jaw member is formed integral with said spring by stamping in said spring outer end a pair of spaced-apart fingers in a flat end of said spring, and a stepped flange between said fingers having a transverse wall extending under said fingers rearwardly thereof with a forward tongue projection under said fingers spaced therefrom and extending parallel thereto, said retention hole being disposed on said connection portion of said band at a predetermined position so that a leading edge of said band projects between said fingers and said tongue to retain said spring outer end captive while permitting said lateral displacement of said outer end.

7. A clamp as claimed in claim 4 wherein said inner connecting end is formed by a right angle step portion stamped at an inner end of said spring, said step defining a lower leading flange merging into a transverse wall, and a flat top wall merging into a top edge of said transverse wall, said step portion being captive in a connecting transverse slot formed in said connecting portion of said band with said transverse wall disposed in said slot and said lower leading flange and said flat top wall disposed adjacent a second side and said first side of said band connecting portion, respectively.

8. A clamp as claimed in claim 7 wherein said leaf spring is provided with an upwardly sloping frontal section to guide said band free end upwardly over said curved biasing section, said leaf spring being normally biased for non-threaded engagement of said band free end by being spaced from said spiral thread and acting as a lever to urge said thread engaging means of said band to engage with said spiral thread.

9. A clamp as claimed in claim 4 wherein said spring pressure exertion means is constituted by a lower one of said fingers, said lower finger being disposed spaced over a lower surface of said band connecting end with said jaw member captive in said retention hole, said lower finger being displaced towards said lower surface by clamping pressure between said band and an outer wall of an object being circumscribed by said band, said displacement of said lower finger urging said spring outer end and hence said biasing section towards said worm screw so as to cause said spiral thread to engage with said spaced-apart screw thread engaging means in said band passing through said housing.

10. A clamp as claimed in claim 9 wherein said screw thread engaging means is constituted by a plurality of spaced-apart thread engaging openings in a connecting portion of said band.

11. A clamp as claimed in claim 9 wherein said screw thread engaging means is constituted by a plurality of teeth punched in said band, each tooth having a worm thread engaging face and a slopping structural wall merging into said band.

12. A clamp as claimed in claim 11 wherein said thread engaging face is disposed offset from the transverse axis of said band.

13. A clamp as claimed in claim 1 wherein said housing is defined by a connecting bottom wall for connection to said connecting portion of said band, a worm screw retention housing of partly circular cross-section extending above said connecting portion, and end bearing collars having a circular section edge extending over 180° circumference to retain said worm screw for free axial rotation therein, said bottom wall having retention means for interconnecting said housing to housing connection means formed in said connecting portion of said band.

14. A clamp as claimed in claim 13 wherein said housing is further provided with a guide spout disposed about said inlet port to guide said free end of said band into said housing.

15. A clamp as claimed in claim 13 wherein said retention means in said bottom wall is constituted by at least a pair of opposed retention wings formed in said bottom wall at opposed ends thereof, said connection means being at least one connecting hole formed in said connecting portion to receive said wings therein with said wings being bent over.

* * * * *